United States Patent [19]
Mabuchi

[11] 4,011,368
[45] Mar. 8, 1977

[54] WATERTIGHT BATTERY CAP

[75] Inventor: Kenichi Mabuchi, Tokyo, Japan
[73] Assignee: Mabuchi Motor Co. Ltd., Tokyo, Japan

[22] Filed: July 10, 1975
[21] Appl. No.: 594,798

Related U.S. Application Data

[63] Continuation of Ser. No. 438,581, Jan. 31, 1974, abandoned.

[52] U.S. Cl. .............................................. 429/121
[51] Int. Cl.[2] .......................................... H01M 6/02
[58] Field of Search .......... 136/133, 181, 135, 173, 136/166, 169; 429/121

[56] References Cited

UNITED STATES PATENTS

| | | | |
|---|---|---|---|
| 705,919 | 7/1902 | Gill | 136/133 |
| 734,896 | 7/1903 | Lammerts | 136/135 R |
| 2,419,589 | 4/1947 | Paul | 136/133 |
| 3,748,185 | 7/1973 | Cooper et al. | 136/181 |

FOREIGN PATENTS OR APPLICATIONS

| | | | |
|---|---|---|---|
| 671,608 | 10/1963 | Canada | 136/133 |
| 281,999 | 2/1965 | United Kingdom | 136/133 |

*Primary Examiner*—Donald L. Walton

[57] ABSTRACT

A battery cap which enables a battery cell to be watertight by covering at least one of the electrodes with a watertight cap which is convex, resilient and dielectric in structure and has a central aperture through which an electrically conductive terminal is positioned for contact with an electrode of the battery.

4 Claims, 6 Drawing Figures

WATERTIGHT BATTERY CAP

This is a continuation of application Ser. No. 438,581, now abandoned, filed Jan. 31, 1974.

FIELD OF THE INVENTION

The present invention relates to a watertight battery cap, and particularly to a watertight battery cap in which at least one electrode of the battery is covered watertightly.

DESCRIPTION OF THE PRIOR ART

Utilization of various electric appliances which require batteries is increasing in popularity. For instance, in many electric appliances used in kitchens, laundry-wash rooms, or bath rooms as well as in different kinds of ship and other toy models, especially toy submarines, it has heretofore been endeavored to make the battery holding case or battery holder into a watertight structure.

As a result, various measures are employed in providing various packing materials around the battery holder. However, there are drawbacks in them which are liable to produce troubles due to water leakage in the holder.

In the present invention the idea of making the battery holder into a watertight structure is replaced by a new approach, wherein at least the side face of the battery which necessitates a watertight structure is covered by a watertight cap, disregarding therefore the possibility of penetration of water into the battery holder or battery holding case.

SUMMARY OF THE INVENTION

An object of the present invention is, therefore, to provide a watertight battery cap in which only one of the electrodes is covered.

Another object of the present invention is to provide a watertight cap for Ni-Cd batteries.

Still another object of the present invention is to provide a watertight cap for Ni-Cd batteries provided with gas escaping means.

Still another object of the present invention is to provide a watertight cap for Ni-Cd batteries having a peripherical circular groove in the upper portion or neck thereof.

A further object of the present invention is to provide a watertight battery cap in which the positive terminal of the battery and an electrically conductive terminal penetrating the central aperture of the cap are during normal operation in electrical contact condition but are normally in a disengaged condition, when the battery is not held in the battery holder.

A further object of the present invention is to provide a watertight battery cap in which the periphery of the central aperture of the cap is made of a resilient member and the electrically conductive terminal is held watertightly therein.

A still further object of the present invention is to provide a watertight battery cap whereby either of the positive or negative electrodes, or both, are covered by the cap.

A yet further object of the present invention is to provide a watertight battery cap capable of allowing gaseous escapes from a peripheral portion of the cap.

DETAILED DESCRIPTION OF THE EMBODIMENT

Figure 1:
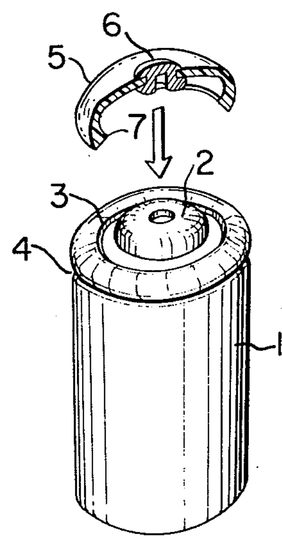
FIG. 1 is a perspective view of a battery and a watertight cap according to the present invention, with a partially cross sectional view of the cap.

Referring to FIG. 1, a battery is shown as having a peripheral portion 1 which functions as a negative terminal on one side face or on the entire portion thereof. The positive terminal 2 is electrically insulated from the negative terminal by means of an insulating sealing ring 3. A groove 4 is provided on the peripheral portion 1 of the battery. Recently a quickly chargeable Ni-Cd battery has been developed, which provides a safety valve in order to let the gas escape during overcharging. Said groove 4 serves to hold the supporting plates of the safety valve. However, needless to say, the present invention is not limited to the aforementioned Ni-Cd battery having the groove 4. The cap 5 is a watertight cap, and is made of resilient insulating material such as rubber. An electrically conductive terminal 6 is in electrical contact with the positive terminal 2 of the battery and serves to deliver electrical energy to the outside. The terminal 6 is inserted into the aperture of the cap 5 which is provided on the center portion thereof.

The inwardly projecting ring portion 7 which is formed at the inner edge of the periphery of cap 5, is adapted to fit the groove 4 on the peripheral portion 1 of the battery. Namely, the inner diameter of the ring portion 7 is slightly smaller than the outer diameter of the groove 4, so as to be snugly fitted to the groove 4 such as by stretching of the resilient cap member 5.

Figure 2:
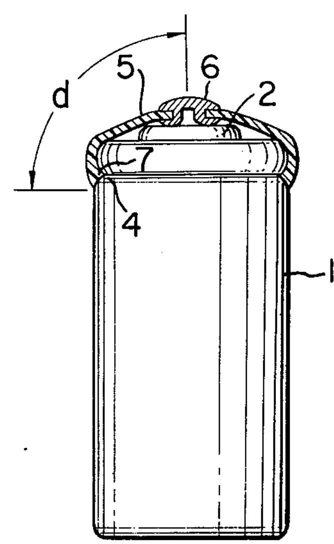
FIG. 2 is one embodiment of the present invention with a partially cross sectional view of a watertight cap fitted onto a battery in which an electrically conductive terminal penetrating the cap and the positive terminal of the battery are in electrical contact condition.

As shown in FIG. 2, when the watertight battery cap is fitted or mounted on the battery, the peripheral portion of the watertight cap can be tightly fitted to the peripheral portion 1 of the battery, so that the surface on which the positive terminal 2 of the battery is located can be protected from the penetration of water.

From the foregoing, it is to be appreciated that by using the watertight cap of the present invention the battery holding case need not necessarily be a complete watertight structure. Consequently, a greater cooling effect will be achieved by the ability of immersing the portion 1 of the battery directly in the water. Further, the distance between the positive and the negative electrodes is greater than in a capless battery as it is shown at *d* in FIG. 2, so that any unexpected short-circuiting can be prevented.

Figure 3:
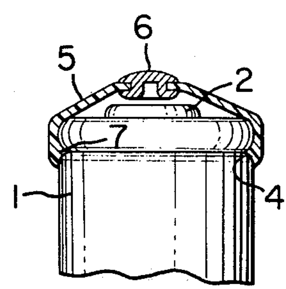
FIG. 3 is another embodiment according to the present invention with a partially cross sectional view of a watertight cap fitted onto a battery in which an electrically conductive terminal penetrating the cap and the positive terminal of the battery are in electrically disengaged condition.
Figure 4:
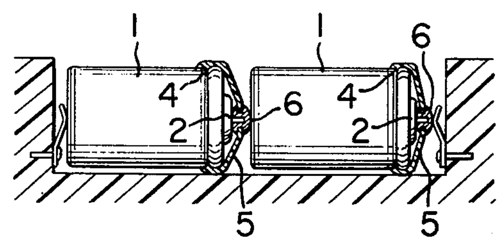
FIG. 4 is a cross sectional view of an embodiment of the invention in which a plurality of batteries with protective caps is held in position in a battery holding case.

FIG. 3 shows a condition in which the positive terminal 2 of the battery and the electrically conductive terminal 6 of the cap are disengaged from each other. The disengagement can be readily carried out by a positive utilization of the resiliency of the watertight cap. Only a battery with the watertight cap enables the terminals 2 and 6 to be electrically in contact with each other when the battery is inserted in the battery holder of an electric appliance as shown in FIG. 4, so that the possibility of unexpected short-circuiting can be completely prevented. This is even more true in a Ni-Cd battery which is capable of quick recharging, wherein the internal resistance is so low that a large discharge of current flows under short-circuiting conditions. In this respect, the effect and merits of the watertight battery cap are striking not only in the establishment of watertightness but also in the prevention of unexpected short-circuiting.

Figure 5:
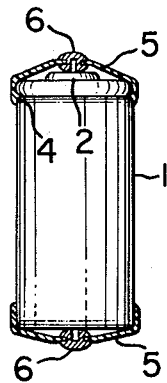
FIG. 5 is a partly cross sectional view of a battery with watertight caps fitted on both positive and negative electrodes.
Figure 6:
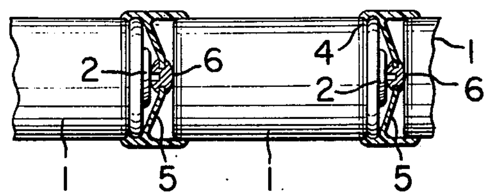
FIG. 6 is another embodiment of a watertight cap of the invention adapted to connect batteries in series.

FIG. 5 shows another embodiment of the present invention in which a watertight structure on the electrically negative side of the battery is equally required. FIG. 6 shows still another embodiment of the watertight battery cap of the present invention in which a series connection of the battery is desired. In FIG. 6, it is to be appreciated that the positive side of one of the batteries and the negative side of one of the adjoining batteries are connected in series by means of a single cap of variant configurations.

The present invention applies also to batteries, where it is desired to prevent a rise in temperature. As it has already been described, since the cap in accordance with the present invention covers only a portion of a battery and the portion which is left uncovered can be immersed in water, the uncovered portion may be used for cooling purposes, which has many other advantages such as simplicity in construction and cost economy.

Finally, the present invention has another very important feature. Namely, since the watertight cap is resiliently fitted to the outer cylindrical portion 1 of a battery, it enables the gas, which is generated from a Ni-Cd battery at time of over-charging and which is contained in the space between the cap and the battery, to escape through the peripherical edge portion of the cap to the outside by slightly expanding the cap under the pressure of the gas.

What I claim is:

1. An improved watertight battery and cap combination comprising:

a first battery having a first terminal at the center of one end face thereof, a second terminal at the opposed end thereof and a peripheral groove formed on the outside surface proximate the end thereof adjacent the first terminal, a movable cap having a first cylindrical portion that surrounds a portion of the periphery of said battery, an inwardly directed lip at one end of said cylindrical portion, said lip engaging the peripheral groove in said battery and a resilient, substantially convex end wall integral with said cylindrical portion at a location axially spaced from the plane of said lip and capable of being moved inwardly towards said first battery terminal upon the application of a force; and a conductive terminal integral with and extending through said end wall of said battery cap and in opposition to one of said battery terminals, said terminal being normally spaced from and capable of contacting said first battery terminal when the force is applied to said end wall but being insulated from said second battery terminal.

2. The combination according to claim 1 wherein there is further included a second battery cap having a terminal positioned such that said terminal of said second battery cap is in electrical contact with said second battery terminal.

3. The combination according to claim 1 including a second battery wherein said battery cap includes a second cylindrical portion that extends from the periphery of said end wall in a direction that is axially opposite to said first cylindrical portion, said second cylindrical portion engaging said second battery that is in electrical series with said first battery when said battery cap terminal is in simultaneous electrical contact with said first terminal of said first battery and said second terminal of said second battery.

4. A watertight cap mountable on a ready-made battery, which cap comprises a substantially convex, resilient dielectric member having a central portion capable of moving inwardly and a peripheral, coupling section defined by a first cylindrical portion for providing a watertight snug fit when used on a battery and an electrically conductive terminal supported by said cap and extending through said central portion thereof, said terminal being movable in accordance with the inward movement of said central portion whereby said terminal, when assembled on the battery is capable of contacting one of the electrodes of the battery but is insulated from the other electrode of the battery, said cap further including a second cylindrical portion that extends from the periphery of said central portion in a direction that is axially opposite to said first cylindrical portion.

* * * * *